United States Patent [19]

de Hair et al.

[11] Patent Number: 4,644,223
[45] Date of Patent: Feb. 17, 1987

[54] LOW-PRESSURE MERCURY VAPOR DISCHARGE LAMP

[75] Inventors: Johannes T. W. de Hair; Johannes T. C. van Kemenade, both of Eindhoven; Everhardus G. Berns, Geldrop, all of Netherlands

[73] Assignee: U.S. Philips Corporation, New York, N.Y.

[21] Appl. No.: 562,608

[22] Filed: Dec. 19, 1983

[30] Foreign Application Priority Data

Dec. 30, 1982 [NL] Netherlands ............... 8205044

[51] Int. Cl.⁴ .................................. H01J 61/44
[52] U.S. Cl. .................................... 313/487
[58] Field of Search .............. 313/485, 486, 487; 252/301.4 P, 301.4 R, 301.6 F

[56] References Cited

U.S. PATENT DOCUMENTS

| | | | |
|---|---|---|---|
| 2,143,077 | 1/1939 | Leverenz | 252/301.6 F |
| 3,294,699 | 12/1966 | Lange | 252/301.4 R |
| 3,595,802 | 7/1971 | Blasse | 252/301.4 R |
| 3,925,239 | 12/1975 | Wanmaker et al. | 252/301.4 P |
| 4,174,294 | 11/1979 | Murakami et al. | 252/301.4 R |
| 4,319,161 | 3/1982 | Looye et al. | 313/486 |

Primary Examiner—Palmer C. DeMeo
Assistant Examiner—Sandra L. O'Shea
Attorney, Agent, or Firm—Norman N. Spain

[57] ABSTRACT

A low-pressure mercury vapor discharge lamp having a very satisfactory color rendition (R(a,8)≧85) and having a color temperature of at least 3200 K. and a color point located on or near the Planckian locus. The lamp is provided with a luminescent layer comprising:

a. a luminescent alkaline earth metal halophosphate activated by $Sb^{3+}$ or by $Sb^{3+}$ and $Mn^{2+}$ b. a luminescent material activated by $Eu^{2+}$ and having an emission maximum at 470–500 nm and a half-width value of at most 90 nm and c. a luminescent rare earth metal metaborate activated by $Ce^{3+}$ and $Mn^{2+}$ and having a fundamental lattice $Ln(Mg,Zn,Cd)B_5O_{10}$, where Ln represents the elements Y, La and/or Gd, which borate has a red $Mn^{2+}$ emission.

13 Claims, 9 Drawing Figures

LOW-PRESSURE MERCURY VAPOR DISCHARGE LAMP

BACKGROUND OF THE INVENTION

The invention relates to a low-pressure mercury vapour discharge lamp having a very satisfactory color rendition, having color temperature of the emitted white light of at least 3200 K. and having a color point ($x_L, y_L$) at or near the Planckian locus, which is provided with a gas-tight radiation-transparent envelope containing mercury and rare gas and with a luminescent layer containing a luminescent halophosphate and a luminescent material activated by bivalent europium.

The expression "a very satisfactory color rendition" is to be understood in this description and the appended claims to mean that the average color rendering index R(a,8) (average value of the rendering indices of eight test colors, as defined by the Commission Internationale d'Éclairage: Publication CIE No. 13.2 (TC-3.2), 1974), has a value of at least 85.

The color of visible radiation is characterized by the color co-ordinates (x,y) which determine the color point in the color triangle (see Publication CIE No. 15 (E-1.3.1), 1971). Lamps for general illumination purposes should emit light which can be considered as "white". White radiation is found in the color triangle at color points located on the Planckian locus or curve. This curve, which is also designated as the curve of the black body radiators and which is indicated hereinafter as the curve P, comprises the color points of the radiation emitted by a completely black body at different temperatures (the socalled color temperature). As the color temperature of white radiation is higher, the x co-ordinate and—from a temperature of about 2500 K.—also the y co-ordinate of the color point have a smaller value. A given color temperature is allotted not only to a given point on the curve P, but also to radiation having color co-ordinates located on a line intersecting the curve P at that point (see the said Publication CIE No. 15). If this radiation has a color point near the curve P, this radiation is also considered as white light having that given color temperature. In this description and the appended claims, the expression "a color point near the curve P" is to be understood to mean that the distance of the color point from the point on the curve P having the same color temperature is at most 20 MPCD (Minimum Perceptible Color Difference) is the unit of color difference; see the publication of J. J. Rennilson in "Optical Spectra", October 1980, page 63.

A large number of embodiments of low-pressure mercury vapour discharge lamps which have been known for tens of years and are still frequently used contain a luminescent alkaline earth metal halophosphate activated by $Sb^{3+}$ and $Mn^{2+}$. These lamps have the advantage that they are inexpensive and emit a satisfactorily high luminous flux. A great disadvantage of these lamps, however, is that their color rendition leaves much to be desired. They generally have R(a,8) values of the order of 50 to 60, and a R(a,8) value of about 75 is only attained with lamps having a high color temperature (for example, 5000 K.) which is not yet considered to be a satisfactory color rendition.

Lamps with which a very satisfactory color rendition is attained have been known for a long time. These lamps are provided with special luminescent materials, i.e. a tin-activated red-luminescing material on the basis of strontium orthophosphate, frequently in combination with a blue-emitting halophosphate activated by $Sb^{3+}$, more particularly a strontium halophosphate of this kind. The said strontium orthophosphate luminesces in a very wide band which extends into the deep red. These known lamps have the disadvantage inherent to the use of the said strontium orthophosphate of a comparatively small luminous flux and of a poor maintenance of the luminous flux during the life of the lamp. It has been found that the last-mentioned disadvantage is a serious limitation to the use of this material in practice with a higher load by the radiation emitted by the mercury discharge.

A lamp of the kind described in the opening paragraph is known from German Patent Application No. 2,848,726. This lamp having a very satisfactory color rendition contains, as the aforementioned lamp type, a red-luminescing tin-activated strontium orthophosphate and further a borate phosphate which is activated by bivalent europium and has an emission band having a maximum at about 480 nm and a half-width value of about 85 nm. Preferably, a luminescent alkaline earth metal halophosphate is further used in the luminescent layer of this lamp. Due to the use of the luminescent strontium orthophosphate, this known lamp again has the disadvantages of a comparatively small luminous flux and more particularly of a poor maintenance of the luminous flux during the life of the lamp.

A satisfactory color rendition (R(a,8) values of 80-85), a high luminous flux and a good maintenance of the luminous flux, even with high loads, are obtained with lamps containing three luminescent materials emitting in three comparatively narrow bands (see Dutch Patent Specification No. 164,697). In these lamps, there is the drawback of disruption of the metamery of certain colors which, though of rare occurrence, is disturbing if particularly high requirements are imposed on the color rendition. The color impression of an object under the light of a lamp is then different from that under the light of a reference radiator having the same color temperature. The colors of two objects are generally designated as being metameric if these objects have a different reflection spectrum, but nevertheless give the same color impression under a given kind of light, for example, day-light. If under another kind of light, for example of an incandescent lamp, the color impression of these objects is different, the metamery is said to be disrupted.

SUMMARY OF THE INVENTION

The invention has for its object to provide low-pressure mercury vapour discharge lamps having a very satisfactory color rendition and more particularly a satisfactory color rendition of a large number of colors, as a result of which the possibility is very small that metamery will be disrupted, while the aforementioned disadvantages of the known lamp are entirely or substantially entirely avoided.

For this purpose, according to the invention a low-pressure mercury vapour discharge lamp of the kind mentioned in the opening paragraph is characterized in that the luminescent layer comprises:
  a. at least one luminescent alkaline earth metal halophosphate activated by trivalent antimony or by trivalent antimony and bivalent manganese;
  b. at least one luminescent material activated by bivalent europium and having an emission maximum in the range of from 470 to 500 nm and a half-width value of the emission band of at most 90 nm, and c. a luminescent rare earth metal metaborate of monoclinic crystal structure which is activated by trivalent cerium and by bivalent manganese and whose fundamental lattice corresponds to the formula $Ln(Mg,Zn,Cd)B_5O_{10}$, in which Ln is at least one of the elements yttrium, lanthanum and gadolinium and in which up to 20 mol.% of the B can be replaced by Al and/or Ga and, which metaborate exhibits red $Mn^{2+}$ emission.

Experiments leading to the invention have surprisingly shown that a very high value of R(a,8) can also be obtained with an emission which has a much narrower band than that of the known luminescent strontium orthophosphate, but whose emission maximum lies at substantially the same location. It has been found that the emission of rare earth metal metaborates activated by $Ce^{3+}$ and $Mn^{2+}$ is particularly suitable for this purpose. These metaborates are known per se and are further described in Dutch Patent Applicant No. 8100346 and U.S. Pat. No. 4,319,161. They have a fundamental lattice of monoclinic crystal structure corresponding to the formula $Ln(Mg,Zn,Cd)B_5O_{10}$. In this formula, Ln is at least one of the elements Y, La and Gd. In this borate up to 20 mol.% of the B can be replaced by Al and/or Ga, which, like the choice of the elements Mg, Zn and/or Cd, has little influence on the luminescent properties. The Ce activator occupies at an Ln location (and may even occupy all Ln locations) and absorbs the exciting radiation energy (mainly 254 nm in a low-pressure mercury vapour discharge lamp) and transmits it to the Mn activator which is built-in at an Mg (and/or Nz and/or Cd) location. This borate has a very efficient emission originating from $Mn^{2+}$ in a band having a maximum at about 630 nm and a half-width value of about 80 nm.

A great advantage of the use of the metaborate in a lamp according to the invention is that also due to the comparatively small quantity of radiation energy in the deep red part of the spectrum, high luminous fluxes can be obtained. It has further been found that the metaborates have a very favourable lamp behaviour. This means that, when employed in a lamp, they retain their favourable luminescent properties, and that they exhibit only a slight decrease in luminous flux during the life of the lamp. This is also the case with a comparatively high radiation load, for example, in lamps having a small diameter of, for example, 24 mm. It should be noted that the use of the known luminescent strontium orthophosphate phosphor has remained limited in practice generally to lamps having a large diameter (36 mm) because of the high decrease in luminous flux especially with a high load.

It has further been found that with the use of the metaborate in lamps, not only high to very high values for the general color rendering index (R(a,8) values of at least 85) can be obtained, but that also a large number of individual object colours can be reproduced very satisfactorily. This becomes manifest if the average color rendition is determined on the basis of a series of 94 test colors as proposed by J. J. Opstelten in "Lighting Research and Technology", Vol. 12, No. 4, 1980, pp. 186–194. This group of 94 test colors comprises both unsaturated and highly saturated colors and has color points more or less regularly distributed in the color space. With lamps according to the invention, a value of this average color rendering index R(a,94) of at least 85 is obtained. A great advantage of the lamps according to the invention inherent to the high value of R(a,94) is that errors in the color rendition due to the fact that metamery is disrupted are entirely or substantially entirely avoided.

In order to obtain such high values of R(a,8) and R(a,94), in a lamp according to the invention, the metaborate (the material c) has to be combined with a material activated by bivalent europium and having an emission maximum in the range of from 470 to 500 nm and a half-width value of the emission band of at most 90 nm (the material b), and with at least one luminescent halophosphate (the material a) of the group of the alkaline earth metal halophosphates activated by Sb or by Sb and Mn. An advantage of the blue-luminescing materials b is that they can be very efficient and that due to the comparatively narrow band of the emission, they substantially do not emit radiation in the short-wave part of the spectrum in which the eye sensitivity is substantially zero. Furthermore, the materials activated by bivalent europium generally have the advantage that they absorb at least in part the blue mercury line emitted by the mercury discharge. The halophosphates a have the advantage of an efficient emission having a broad band and excellently complementing the spectrum of the radiation emitted by the materials b and c.

The halophosphates used as material a are luminescent materials which have been known for a long time. They have the crystal structure of the mineral apatite and, as is known, their composition generally deviates slightly from the stoichiometric formula $M_{10}(PO_4)_6X_2$, (M = alkaline earth metal, X is halogen). As alkaline earth metal use is mainly made of calcium and/or strontium. If only Sb is used as an activator, a broad-band emission is obtained in the blue part of the spectrum. If Mn is also added as an activator, white-luminescing materials can be obtained whose color temperature is mainly determined by the Sb:Mn ratio. As the halogen, fluorine and/or chlorine is generally used in the halophosphate. With a given F:Cl ratio, the color point of the radiation emitted by the halophosphate lies on or substantially on the Planckian locus. If this ratio assumes lower values, the color point is shifted to locations below the Planckian locus, whereas with higher values of F:Cl the color point is shifted to locations above this curve. Thus, for example, yellow-luminescing halophosphates are also known.

DETAILED DESCRIPTION OF THE INVENTION

Figure 1:
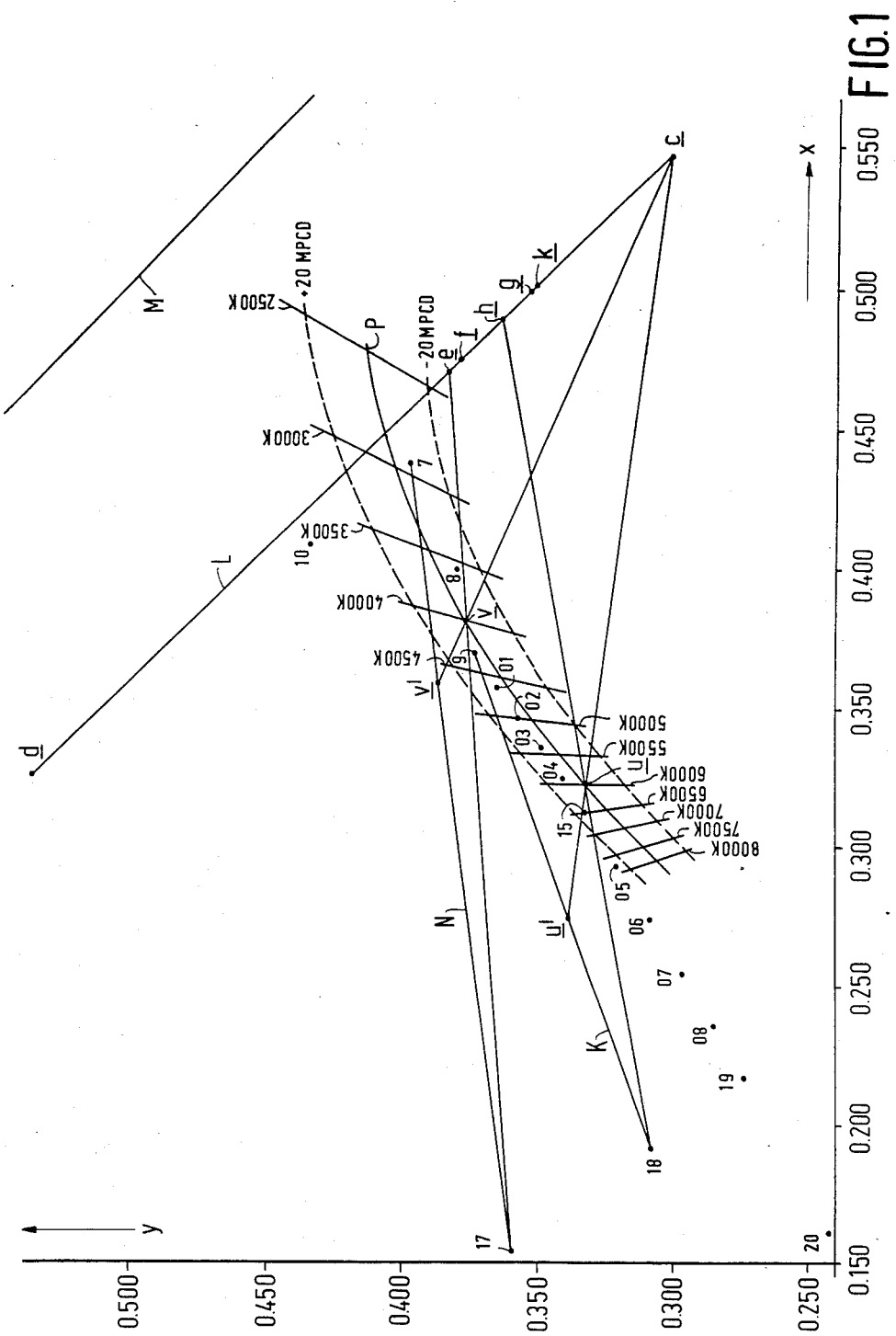
FIGS. 1, 2, 3, 4, 5, 6 and 7 are graphs showing the color points of various luminescent materials and the lamps of the invention.

Lamps according to the invention are preferred, which are characterized in that the luminescent halophosphate a is a calcium halophosphate activated by antimony and manganese and having a color temperature of the emitted radiation of at least 2900 K. In fact, when compared with the strontium halophosphates, the calcium halophosphates have a smaller decrease in luminous flux during the life of the lamp even with a high load, for example, in lamps having a small diameter. An additional advantage of calcium halophosphates is that they are frequently used and are inexpensive and can be obtained with any desired color temperature from about 2900 K. A desired color temperature can be obtained not only by a suitable choice of the Sb:Mn ratio, but also by the use of mixtures of two halophosphates having different color temperatures. A halophosphate having a very high color temperature can also be obtained by mixing a blue-luminescing Sb-activated halophosphate with a white-luminescing Sb-and Mn-activated halophosphate. This substantially continuous possibility of choosing the color temperature of the halophosphate renders an optimization of lamps according to the invention quite possible, which will be explained further.

Preferably, a lamp according to the invention is characterized in that the luminescent layer contains a material (d) activated by trivalent terbium which has a green $Tb^{3+}$ emission. The use of the Tb-activated luminescent materials affords the advantage that a larger color temperature range becomes possible for the lamps according to the invention. In general, such a material is necessary in order to obtain lamps having a comparatively low color temperature (of from 3200 K. to about 4200 K.) with the above mentioned high values of $R(a,8)$ and $R(a,94)$. It has also been found that for higher color temperatures the optimum results are generally obtained if a material having a Tb-emission is used. The Tb-emission provides an additional degree of freedom, as a result of which an optimization becomes more readily possible. Furthermore, the use of Tb-activated luminescent materials has the advantage that such green-luminescing materials are generally very efficient and contribute significantly to the luminous flux emitted by the lamp. As material d use may be made of, for example, the known Tb-activated cerium magnesium aluminates (see Dutch Patent Specification No. 160,869) or cerium aluminates (see Dutch Patent Application No. 7216765), which aluminates have a hexagonal crystal structure related to magnetoplumbite. A Ce- and Tb-activated metaborate is also very suitable, the fundamental lattice of which is the same as that of the metaborates having red $Mn^{2+}$ emission (the material c). In these known borates (see the aforementioned Dutch Patent Application No. 8100346 and U.S. Pat. No. 4,319,161) Ce and Tb are built-in at an Ln location and the exciting radiation is absorbed by the cerium and transmitted to the terbium activator. These Tb-activated materials all have a very favourable lamp behaviour and especially a good maintenance of the high luminous flux during the operation of the lamps.

An embodiment of a lamp according to the invention, which is preferred, is characterized in that the luminescent metaborate c is further activated by trivalent terbium, the metaborate c being at the same time the material d and satisfying the formula $$(Y,La,Gd)_{1-x-y}Ce_xTb_y(Mn,Zn,Cd)_{1-p}Mn_pB_5O_{10},$$

in which
 $0.01 \leq x \leq 1-y$
 $0.01 \leq y \leq 0.75$
 $0.01 \leq p \leq 0.30$,
and in which up to 20 mol.% of the B can be replaced by Al and/or Ga. This lamp has the great advantage that both the red $Mn^{2+}$ emission and the green $Tb^{3+}$ emission are supplied by one luminescent material. Thus, the manufacture of the lamps is of course simplified because a smaller number of luminescent materials are required. In these lamps, the desired relative red $Mn^{2+}$ contribution and green $Tb^{3+}$ contribution can be adjusted by varying the concentrations of Mn and Tb in the metaborate. As will appear hereinafter, the value of these relative contributions is dependent upon the desired color point of the lamp and upon the luminescent materials a and b used. It is possible to manufacture and to optimize one luminescent metaborate, whose ratio between the $Mn^{2+}$ emission and the $Tb^{3+}$ emission has a value near the average desired value and to carry out in a given lamp application a correction (dependent upon the desired color point) with either a small quantity of a red- or deep red-luminescing metaborate or with a small quantity of a green or deep green-luminescing Tb-activated material. It is of course also possible to optimize two luminescent metaborates with which lamps of any desired color temperature may be realized by the use of suitable mixtures of these two materials.

In a lamp according to the invention, the luminescent layer of which comprises the materials a, b, c and, as the case may be, d, the choice of one of these materials is determined not only by the desired color point, but also by the choice of the remaining luminescent materials. Thus, it has been found that the choice of a specific blue-luminescing material (b) activated by $Eu^{2+}$ for a lamp having a given color temperature allows the use only of a given group of halophosphates (a), whereby any other halophosphates have to be excluded as they would lead to lamps having too low values ($<85$) of $R(a,8)$ and $R(a,94)$. If a specific choice is then made from the group of the halophosphates that can possibly be used, it is found that the lamp having the desired colour temperature, apart from the color rendition requirements imposed, can be obtained only with the use of a given series of mixtures of the luminescent materials c and d. The series of mixtures that can possibly be used of the materials c and d is generally limited further by the requirement that the lamp must have $R(a,8)$ and $R(a,94)$ values of at least 85.

For further explanation, reference is made to FIG. 1 of the drawing. This Figure represents a part of the color triangle in the (x,y) color co-ordinate plane. The x-co-ordinate is plotted on the abscissa and the y-co-ordinate of the color point is plotted on the ordinate. Of the sides of the color triangle itself, on which the color points of monochromatic radiation are located, only the part denoted by M is visible in FIG. 1. The FIG. 1 shows for color temperatures of from about 2500 K. to about 8000 K. the Planckian locus or curve denoted by P. The dotted curves designated by +20 MPCD and −20 MPCD comprise the color points of radiation which are located at a distance of 20 MPCD above and below the curve P, respectively. Color points of constant color temperature are located on lines intersecting the curve P. A number of these lines are drawn and indicated with the associated color temperature: 2500 K., 3000 K. . . . 8000 K. FIG. 1 further indicates in numerals and letters the color point of a number of lamps and luminescent materials. In this description and the appended claims, the color point of a luminescent material is to be understood to mean the color point of a low-pressure mercury vapour discharge lamp having a length of about 120 cm and an inner diameter of about 24 mm and operated with a power consumption of 36 W, which lamp is provided with a luminescent layer which comprises only the said luminescent material, the chosen value of the layer thickness being an optimum as regards the relative luminous flux. Therefore, for the color points of luminescent materials the influence of the visible radiation emitted by a low-pressure mercury vapour discharge lamp itself is always taken into account. It should be noted that the luminous efficiency of the luminescent material still slightly influences the location of the color point. The use of the luminescent materials in low-pressure mercury vapour discharge lamps other than the said 36 W-type will generally lead to only a very small shift of the color points with respect to those shown herein.

In FIG. 1, c denotes the color point of a red-luminescing metaborate activated by Ce and Mn and having the color co-ordinates (x;y)=(0.546; 0.301). d denotes the color point of a green-luminescing Tb-activated material. The points designated by the reference numerals 17, 18 and 20 are the color points of three luminescent materials activated by bivalent europium and having an emission maximum between 470 and 500 nm. The graph shown in FIG. 1 further indicates the color points of a number of conventional calcium halophosphates emitting white light and having different color temperatures (the points 7, 8, 9 and 15), of blue-luminescing Sb-activated calcium halophosphate (point 19) and of yellow-luminescing Sb- and Mn-activated calcium fluorophosphate (point 10). Other color temperatures are possible by varying the Sb:Mn ratio, but also by using mixtures of halophosphates. Thus, 01, 02, 03 and 04 in FIG. 1 indicate the color points of mixtures of the materials 15 and 9, and 05, 06, 07 and 08 indicate the color points of mixtures of the materials 15 and 19. The following Table 1 indicates the color co-ordinates and the color temperatures of the said halophosphates.

TABLE 1

| material | x | y | T (K) |
|---|---|---|---|
| 7 | 0.437 | 0.397 | 2945 |
| 8 | 0.399 | 0.380 | 3565 |
| 9 | 0.368 | 0.373 | 4335 |
| 15 | 0.312 | 0.332 | 6505 |
| 19 | 0.216 | 0.273 | >20000 |
| 01 | 0.357 | 0.365 | 4640 |
| 02 | 0.346 | 0.357 | 5000 |
| 03 | 0.334 | 0.349 | 5420 |
| 04 | 0.323 | 0.341 | 5900 |
| 05 | 0.293 | 0.321 | 7800 |
| 06 | 0.274 | 0.309 | 9650 |
| 07 | 0.255 | 0.297 | 12500 |
| 08 | 0.236 | 0.285 | 18200 |
| 10 | 0.410 | 0.434 | 3730 |

With the use of two luminescent materials in a lamp, all the color points located on the connection line of the color points of the two chosen materials can be attained. By way of example, in FIG. 1 the connection line K of the color points of the halophosphate 9 and of the blue-luminescing material 18 is represented. The location of the color points lying on the line K of lamps only provided with the materials 9 and 18 is invariably determined by the relative quantum contributions of the materials 9 and 18 to the radiation emitted by the lamp. The distance of the color point of the lamp from the point 9 divided by the distance between the points 9 and 18 is in fact proportional to the relative quantum contribution of the material 18 and to the relative luminous flux (lm/W) supplied by the material 18 if it is provided in the lamp as the only luminescent material and is further inversely proportional to the y-co-ordinate of the color point of the material 18. An analogous relation applies to the distance of the color point from the point 18. With the use of given materials 9 and 18 (for which the relative luminous flux and the y-co-ordinate are consequently fixed), only the relative quantum contributions therefore determine the color point of the lamp. For these materials 9 and 18, the required relative quantum contributions are then known if a given color point of the lamp is desired. These quantum contributions in the first instance are a measure of the quantity of the materials 9 and 18 to be used. When determining these quantities, the quantum efficiency and the absorption of exciting radiation of the materials 9 and 18 and moreover factors, such as, for example, the grain size of the materials used, should be taken into account. If luminescent layers are used which do not form a homogeneous mixture of the materials 9 and 18, especially if the materials are applied in separate juxtaposed layers, great differences may of course occur in absorption of exciting radiation by the materials 9 and 18. As a result, with the same relative quantum contributions, the relative quantities of the materials 9 and 18 may greatly differ from those with the use of homogeneous mixtures. In general, it will be desirable to check for a few test lamps whether the desired relative quantum contributions are reached with the choice of the quantities of the luminescent materials.

For illustration, the color point u of a lamp having a color temperature of 6000 K. and a colour point on the curve P is indicated in FIG. 1. This lamp can be obtained, for example, by the use of a luminescent layer comprising the blue-luminescing material 18 and the halophosphate 9. If the luminescent layer has added to it only the material c (Ce- and Mn-activated rare earth metal metaborate having a color point x=0.546 and y=0.301), the relative quantum contributions of the materials 18 and 9 are fixed. In fact, the latter then have to be chosen so that with these materials the color point u' is reached, u' being located on the connection line between c and u. By a suitable choice of the relative quantum contributions of the material c and of the combination u', the color point u is reached. If the luminescent layer has added to it as the fourth constituent a green-luminescing terbiumactivated material, for example, the Ce- and Tb-activated metaborate d having a color point x=0.324 and y=0.535, it is found that the ratio of the relative quantum contributions of the materials d and c (d:c) is determined by the chosen ratio of the relative quantum contributions of the materials 18 and 9 (18:9). As the ratio (18:9) increases, the ratio (d:c) increases in such manner that the color point obtained with d and c is located on the connection line of the color point obtained with 18 and 9 and the point u. The largest ratio (d:c) with which it is possible to reach the color point u is indicated in FIG. 1 by the point h. In this case, however, the luminescent layer does not contain halophosphate 9. Although for all the ratios (d:c) with color points between the points c and h located on the connection line L of c and d the color point u can be obtained by combination with the materials 18 and 9, in general not every combination will lead to a lamp having R(a,8) and R(a,94) values of at least 85. Especially in those cases in which the contribution of the halophosphate 9 is equal to zero or is very small, the lamp will not satisfy the requirements imposed. The range of (d:c) ratios with which lamps according to the invention are obtained can be determined with a few test lamps and appears to comprise, for example, the ratios lying between the points c and k. The presence of such a range between c and k offers the advantage that optimization of the lamp is quite possible.

Moreover, by way of further example, FIG. 1 indicates the color point v of a lamp having a colour temperature of 4000 K. and a colour point located on the curve P. This lamp can be obtained with the blue-luminescing material 17 and the halophosphate 7, which two materials together yield color points located on the connection line N of 17 and 7. If as a further luminescent material only the material c is used, the color point v can be reached with the lamp if the relative quantum contributions of 7 and 17 are chosen so that with the materials 7 and 17 the point v' located on the connection line between v and c is attained. At this comparatively low color temperature of 4000 K., however, a Tb-activated green-luminescing material, such as d, appears to be necessary to obtain the desired high R(a,8) and R(a,94) values. The largest relative quantum contribution of the material d with which it is possible to reach the color point v, is that contribution which in combination with only the material c leads to the color point e on the line L. In this case, however, the lamp does not contain halophosphate 7, and it also appears that the color rendition requirements are not satisfied. The range of (d:c) ratios within which this is the case and in which optimization of the lamp is possible, can be determined and proves to comprise, for example, the ratios lying between the points f and g.

A very advantageous embodiment of a lamp according to the invention is characterized in that the material b is a luminescent aluminate which is activated by bivalent europium and corresponds to the formula $Sr_{1-p}Eu_pAl_qO_{\frac{3}{2}q+1}$, in which up to 25 mol.% of the strontium can be replaced by calcium and in which $0.001 \leq p \leq 0.10$ and $2 \leq q \leq 5$, which aluminate has its emission maximum at 485–495 nm and has a half-width value of 55–75 nm. The color point of the radiation emitted by such an aluminate is indicated in FIG. 1 by the point 17 and has the co-ordinates x=0.152 and y=0.360. These luminescent strontium aluminates are described more fully in Dutch Patent Application No. 8201943. They completely satisfy the condition imposed of an emission having a comparatively narrow band with a maximum in the range of from 470 to 500 nm. Furthermore, these materials are very efficient luminescing materials which can be subjected even for a long time to high loads in lamps and then exhibit only a very small decrease in luminous flux.

Figure 2:
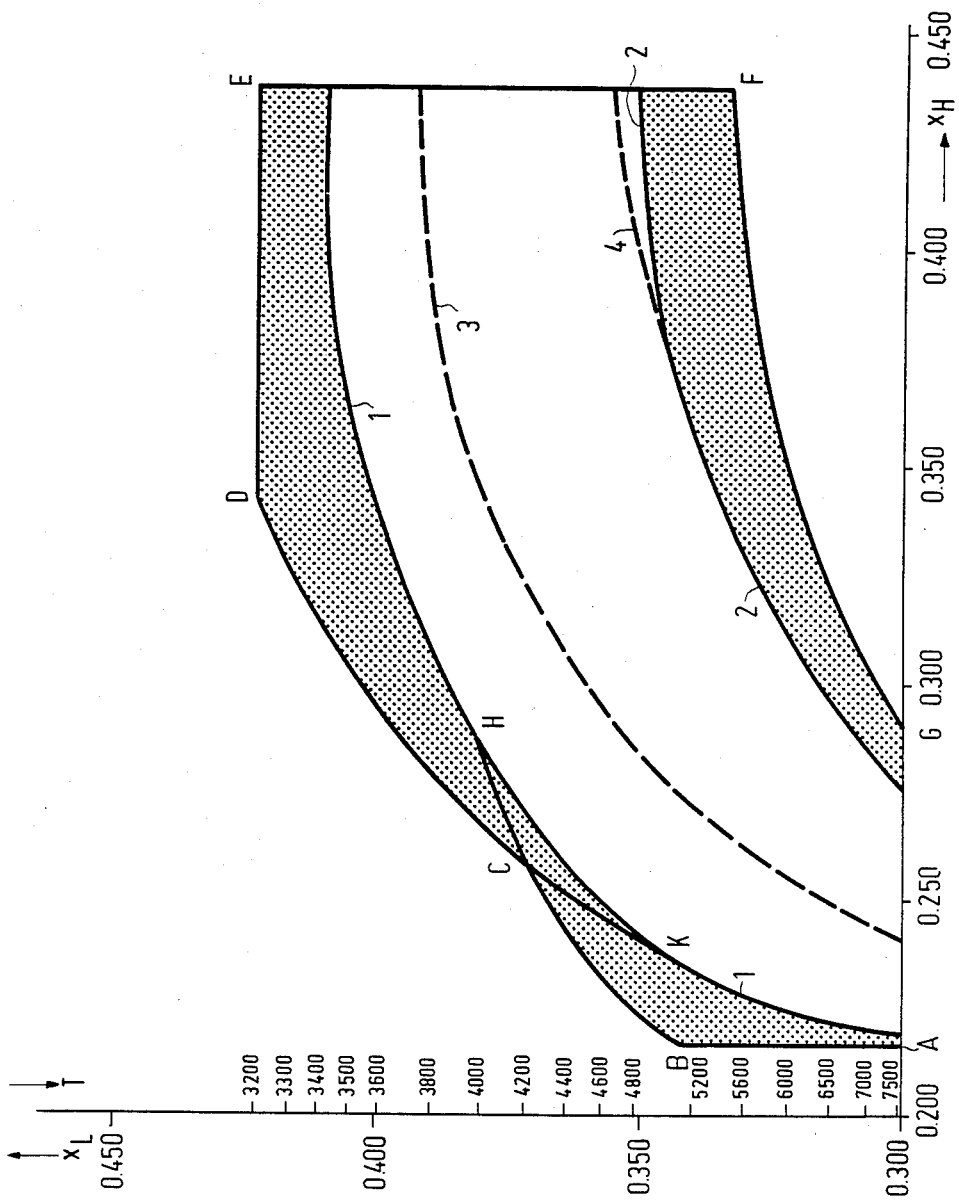

Especially such a lamp containing strontium aluminate is preferred, which has a color point of the emitted radiation $(x_L, y_L)$ and a color temperature T, T being chosen in the range 3200 K. $\leq$ T $\leq$ 7500 K., which lamp is characterized in that the halophosphate a is a calcium halophosphate activated by Sb or by Sb and Mn and having a colour point of the emitted radiation $(x_H, y_H)$, where $x_H$ lies in the range $0.210 \leq x_H \leq 0.440$ and the combination $(T, x_H)$ lies in the region of the graph of FIG. 2 indicated by ABCDEFG. In the graph of FIG. 2, the co-ordinate of the calcium halophosphate to be used $(x_H)$ is plotted on the abscissa. The color temperature T (in K.) of the lamp according to the invention is plotted on the right-hand part of the ordinate. The x-co-ordinate of the lamp $(x_L)$ is plotted on the lefthand part of the ordinate, whereby it should be noted that the given $x_L$ values only correspond to the T values indicated beside them at color points $(x_L, y_L)$ on the curve P. It now appears from FIG. 2, which halophosphates are preferably used in accordance with the invention if a lamp containing the aforementioned blue-luminescing strontium aluminate and having a desired color temperature T is to be manufactured. Examinations have shown that with all the $(T, x_H)$ combinations lying within the region enclosed by the line ABCDEFG and the $x_H$ axis, lamps can be obtained having R(a,8) and R(a,94) values of at least 85. The region ABCDEFG also comprises the possible combinations $(T, x_H)$ for lamps having a color point located near the curve P. If only color points $(x_L, y_L)$ on or substantially on the curve P itself are considered, especially the region not shaded in grey between the lines indicated by 1 and 2 applies. The grey region between the lines 1 and KDE also applies especially to lamps according to the invention which have a color point located below the curve P (down to −20 MPCD). For lamps having a color point located above the curve P (up to +20 MPCD), possible combinations $(T, x_H)$ are also found in the region shaded in grey between the lines ABH and 1 and also in the grey region between the lines GF and 2.

It has been found that optimum results are obtained with lamps according to the invention which contain the strontium aluminate described above and which have a color temperature of at least 3700 K. and a color point on or substantially on the curve P, if the combination $(T, x_H)$ lies in the region between the lines 3 and 4 of the graph of FIG. 2. In this region (the line 4 partly coincides with the line 2) lamps can generally be obtained which have R(a,8) and R(a,94) values of at least 90.

Figure 3:
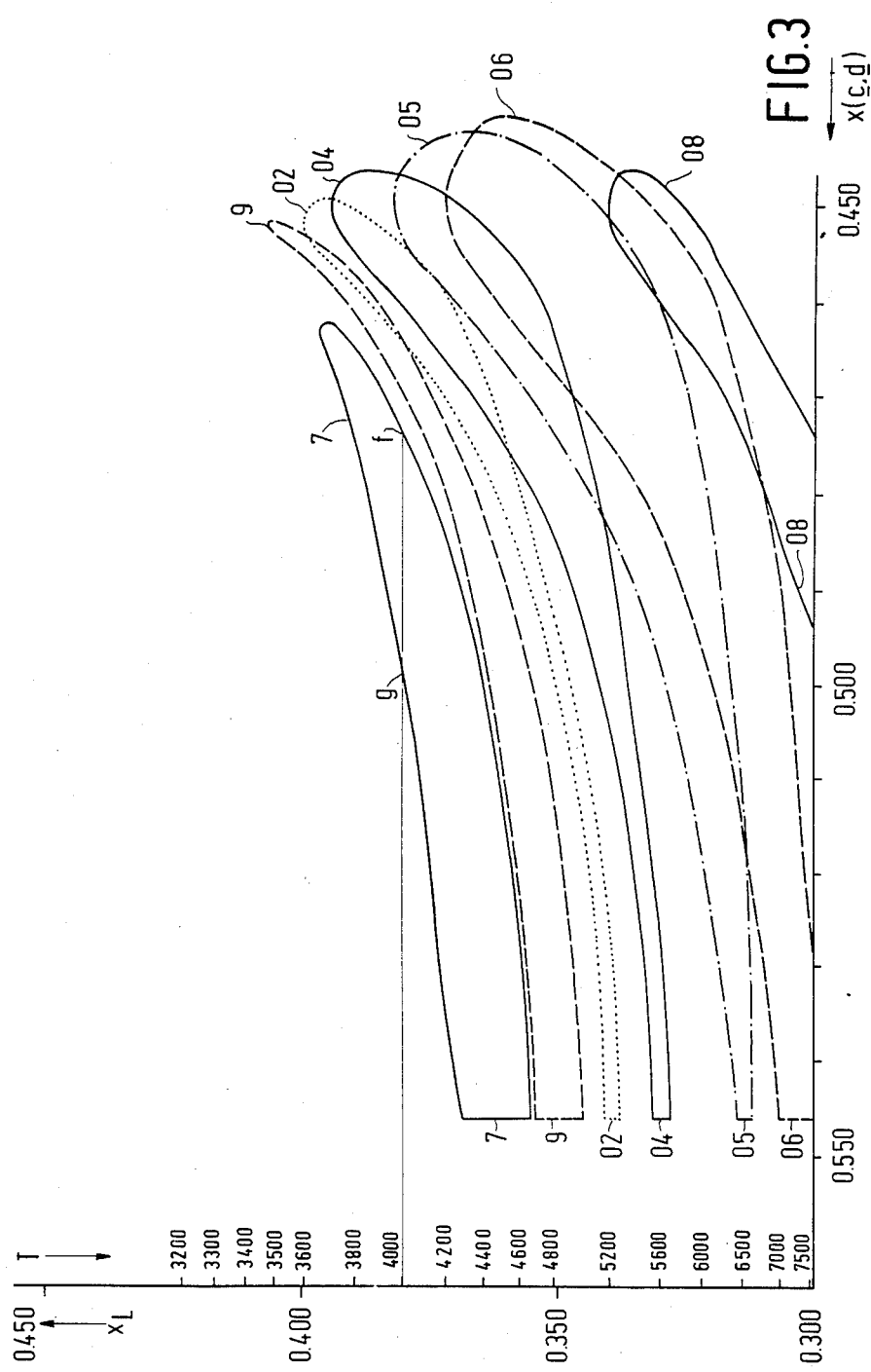

If with reference to FIG. 2, a lamp according to the invention having a given colour temperature T is to be manufactured, it can be determined from this Figure, which calcium halophosphates in combination with the blue-luminescing strontium aluminate are preferred. As appears from the explanation with respect to FIG. 1 of the use of a given halophosphate, the contributions of the luminescent materials c and d to be used cannot be chosen quite freely. By way of example, FIG. 3 indicates for a number of practical calcium halophosphates, which relative contributions of the materials c and d are possible for lamps containing strontium aluminate and having a colour point on the curve P. In the graph of FIG. 3, the x-co-ordinate x(c,d) of the colour points that can be attained with the materials c and d only is plotted on the abscissa. As in FIG. 2, the colour temperature T (in K.) is plotted on the righthand part and the x-co-ordinate $x_L$ of the lamp according to the invention on the lefthand part of the ordinate. The loops denoted by the numerals 7, 9, 02, 04, 05, 06 and 08 limit the regions within which lamps according to the invention having R(a,8) and R(a,94) values of at least 85 are obtained with the respective calcium halophosphates 7, 9, 02 . . . 08 from Table 1. The halophosphates are stated here in the order of succession of decreasing $x_H$ value. The loops partly overlap each other, the loop of the halophosphate of the highest $x_H$ value being found in the lefthand upper part of the graph. As the $x_H$ value is smaller, the relevant loop is found further displaced to the righthand lower part of the graph. For halophosphates having an $x_H$ value lying between those of the halophosphates mentioned herein, intermediate loops are found.

By way of example, for the lamp designated in FIG. 1 by v, having a color temperature T=4000 K. and provided with the halophosphate 7 and a blue-luminescing strontium aluminate, the range of x(c,d) is indicated by the points f and g which correspond to f and g in FIG. 1. It also appears from FIG. 3 that for a lamp having a given color temperature T, there can generally be made a choice from several possible calcium halophosphates. It is then mostly advantageous to choose that halophosphate whose loop in FIG. 3 has the largest cross-section with the line through the chosen point T on the ordinate and parallel to the x(c,d) axis. In fact, the manufacture of the lamp is then less critical because slight deviations in the envisaged relative quantum contributions of the luminescent materials are not seriously disturbing. Thus, it appears from FIG. 3 that for the 4000 K. lamp the halophosphate 7 is a favourable choice. The choice for this lamp of the halophosphate 9 is less favourable (the line f-g only has a small cross-section with the loop 9). The halophosphates 02 and certainly 04 are again more advantageous in this respect.

Another very advantageous embodiment of a lamp according to the invention is characterized in that the material b is a luminescent aluminate which is activated by bivalent europium and corresponds to the formula $Ba_{1-p}Eu_pAl_qO_{\frac{1}{2}+1}$, in which up to 25 mol.% of the barium can be replaced by strontium and in which $0.005 \leq p \leq 0.25$ and $5 \leq q \leq 10$, which aluminate has its emission maximum at 475–485 nm and has a half-width value of 70–90 nm. The color point of the radiation emitted by such a barium aluminate is indicated in FIG. 1 by the point 20 and has the co-ordinates $x=0.161$ and $y=0.242$. These luminescent barium aluminates are described more fully in Dutch Patent Application 8105739. These aluminates also completely satisfy the condition of an emission having a comparatively narrow band emission with a maximum in the range of from 470 to 500 nm. These materials are very efficiently luminescing materials which have a high maintenance of the luminous flux during the life of the lamp and which can be subjected to high loads in lamps.

Figure 4:
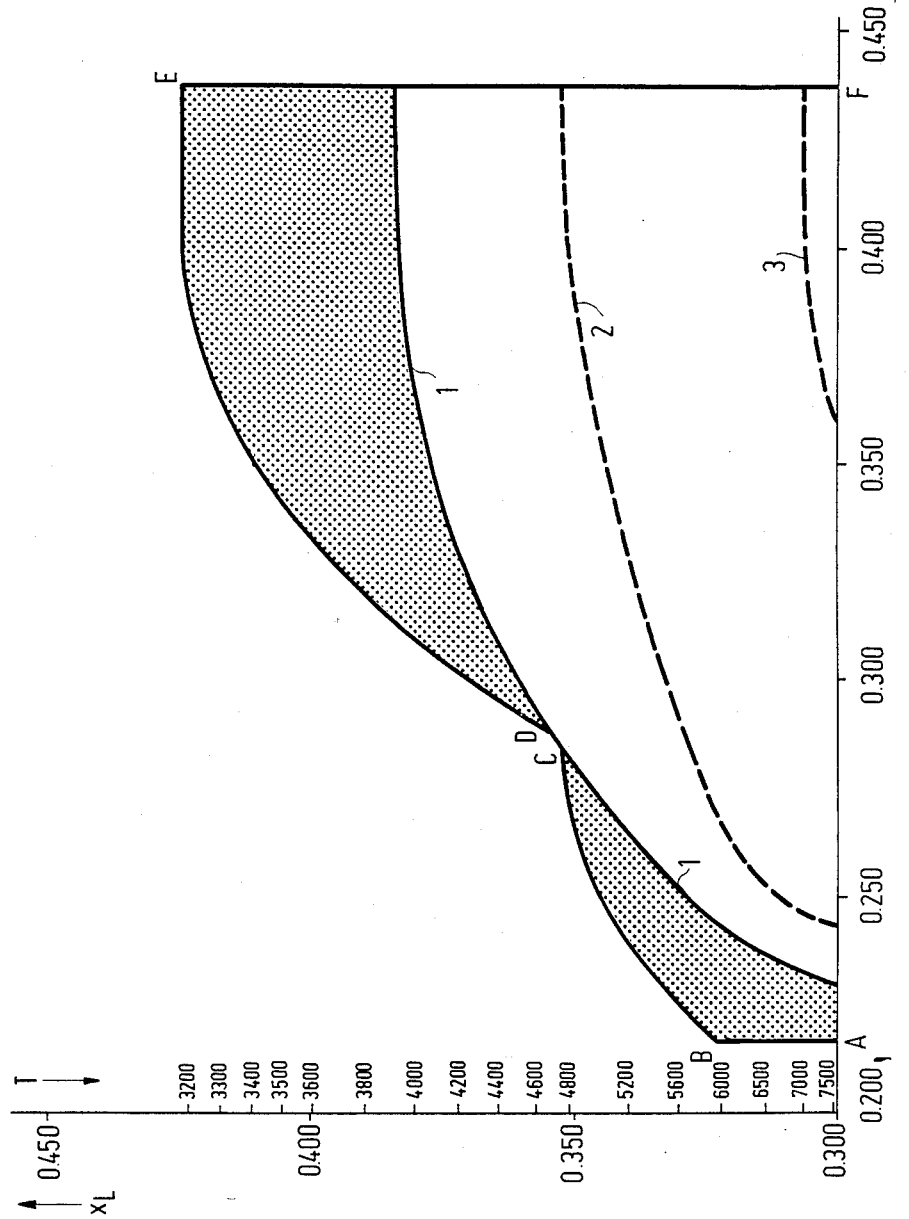

Especially such a lamp containing barium aluminate is preferred, which has a color point of the emitted radiation $(x_L, y_L)$ and a color temperature T, T being chosen to lie in the range 3200 K. $\leq T \leq$ 7500 K., which lamp is characterized in that the halophosphate a is a calcium halophosphate activated by Sb or by Sb and Mn and having a color point of the emitted radiation $(x_H, y_H)$, $x_H$ lying in the range $0.210 \leq x_H \leq 0.440$ and the combination $(T, x_H)$ lying in the region of the graph of FIG. 4 designated by ABCDEF. FIG. 4 is analogous to FIG. 2 and shows in a graph the x-co-ordinates of the calcium halophosphates preferably to be used if lamps containing the aforementioned luminescent barium aluminate are manufactured. It has again been found that with all the $(T, x_H)$ combinations lying within the region enclosed by the line ABCDEF and the $x_H$ axis, lamps having R(a,8) and R(a,94) values of at least 85 can be obtained. If only lamps having a color point $(x_L, y_L)$ on or substantially on the curve P are considered, more particularly the region not shaded in grey below the line denoted by 1 applies. The grey region between the lines 1 and ABC also applies to lamps according to the invention having a color point above the curve P (up to +20 MPCD) and the grey region between the lines 1 and DE also applies to lamps having a color point below the curve P (down to −20 MPCD).

Figure 5:
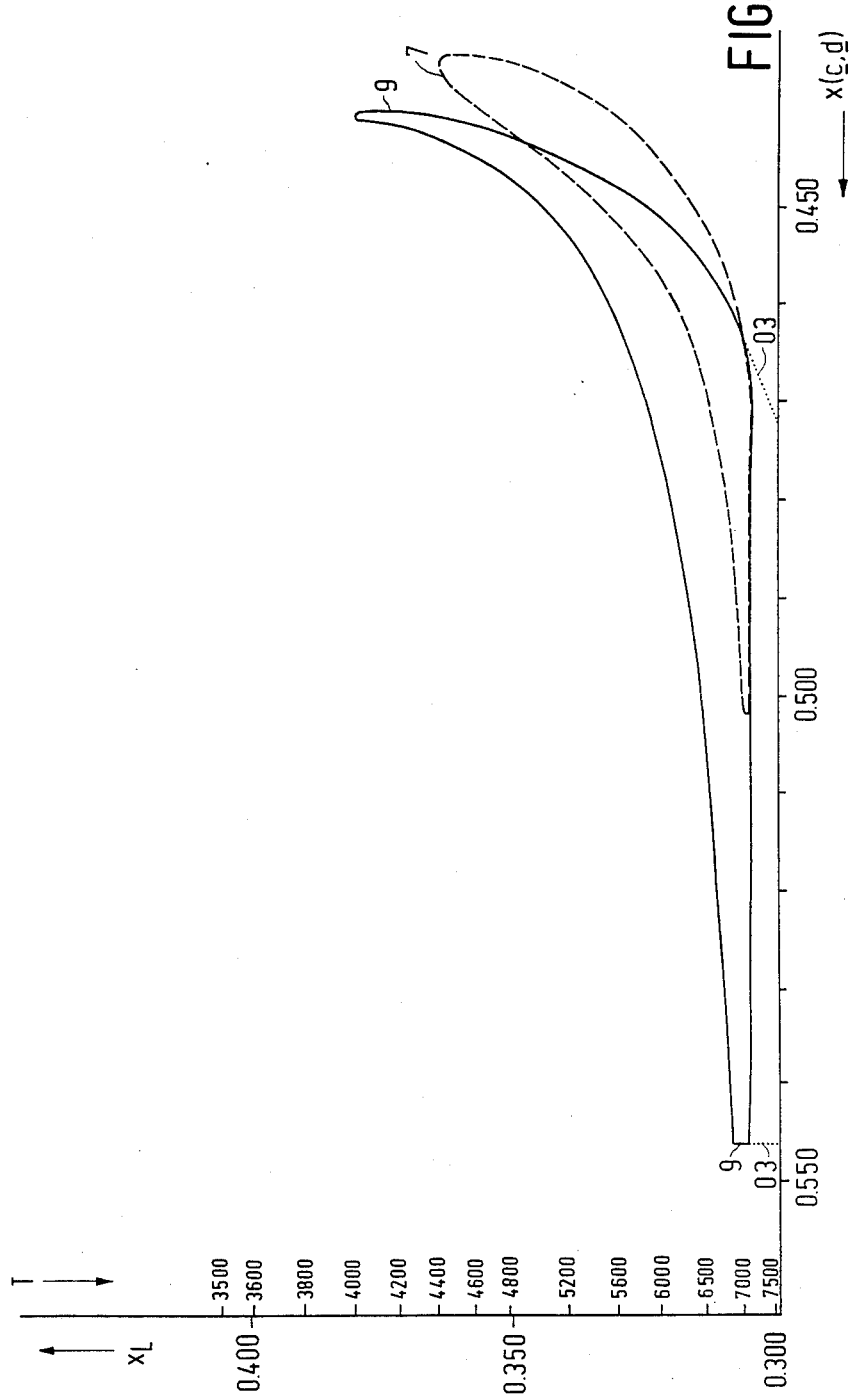

The optimum results are obtained with lamps according to the invention which contain the luminescent barium aluminate described above and which have a color temperature of at least 4800 K. and a colour point on or substantially on the curve P if the combination $(T, x_H)$ lies in the region between the lines 2 and 3 of the graph of FIG. 4. In fact, in this region lamps can be obtained having R(a,8) and R(a,94) values of at least 90. In FIG. 5 there is indicated in the same manner as in FIG. 3 for a few practical calcium halophosphates, which relative contributions of the materials c and d are possible for lamps containing barium aluminate and having a color point on the curve P. In this FIG. 5 loops designated by 7, 9 and 03 apply to the halophosphates 7, 9 and 03, respectively, from Table 1. The loop 7 (broken line) overlaps for a large part the loop 9 (full line). For the halophosphates with $x_H$ smaller than about 0.370 (halophosphate 9 has $x_H=0.368$), the loops prove to coincide substantially, except for the range of lamps having a very high T ($T>7000$ K.) so that the choice of the halophosphate to be used is then not very critical. The region applying to the halophosphate 03 comprises besides the region indicated by the dotted line 03 substantially the whole region applying to halophosphate 9.

A further advantageous embodiment of a lamp according to the invention is characterized in that the material b is a luminescent borate phosphate activated by bivalent europium and corresponding to the formula $$m(Sr_{1-x-y-p}Ba_xCa_yEu_p)O.(1-n)P_2O_5.n(B_2O_3),$$

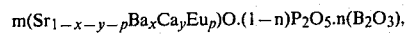

in which
$0 \leq x \leq 0.5$
$0 \leq y \leq 0.2$
$0.001 \leq p \leq 0.15$
$1.75 \leq m \leq 2.30$
$0.05 \leq n \leq 0.23$, This borate phosphate has its emission maximum at 470–485 nm and has a half-width value of 80–90 nm. The color point of the radiation emitted by such a borate phosphate is indicated in FIG. 1 by the point 18 and has the coordinates $x=0.191$ and $y=0.308$. These luminescent borate phosphates are known from the aforementioned German Patent Application 2848726. They have a tetragonal crystal structure and are found to be efficiently luminescing materials having an emission which is very suitable for lamps according to the invention.

Especially such a lamp containing borate phosphate is preferred, which has a color point of the emitted radiation $(x_L, y_L)$ and a color temperature T, T being chosen to lie in the range 3200 K. $\leq T \leq$ 7500 K., which lamp is characterized in that the halophosphate a is a calcium halophosphate activated by Sb or by Sb and Mn and having a colour point of the emitted radiation $(x_H, y_H)$, $x_H$ lying in the range $0.210 \leq x_H \leq 0.440$ and the combination $(T, x_H)$ lying in the region of the graph of FIG. 6 designated by ABCDEF. FIG. 6 is again analogous to FIG. 2 and indicates the x co-ordinates of the calcium halophosphates to be preferably used for lamps containing the aforementioned luminescent borate phosphate. With combinations $(T, x_H)$ lying within the region enclosed by the line ABCDEF and the $x_H$ axis, lamps can be obtained having R(a,8) and R(a,94) values of at least 85. Especially the region not shaded in grey between the lines denoted by 1 and 2 applies to lamps having a color point $(x_L, y_L)$ on or substantially on the curve P. The grey region between the lines 1 and BGH and at the same time the grey region below the line 2 apply also to lamps according to the invention having a color point located above the curve P (up to +20 MPCD). The grey region between the lines 1 and KDE also applies to lamps having a color point located below the curve P (down to −20 MPCD).

Figure 6:
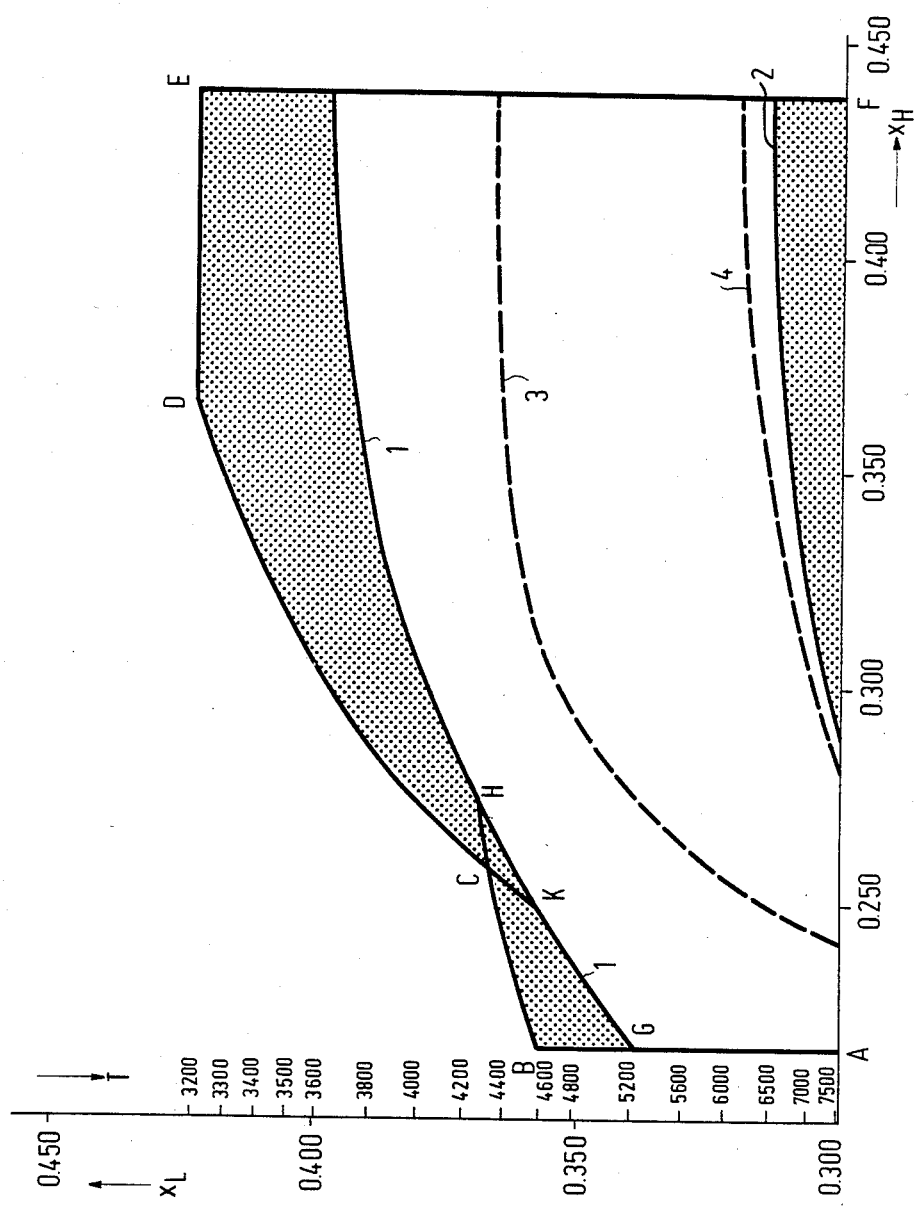
Figure 7:
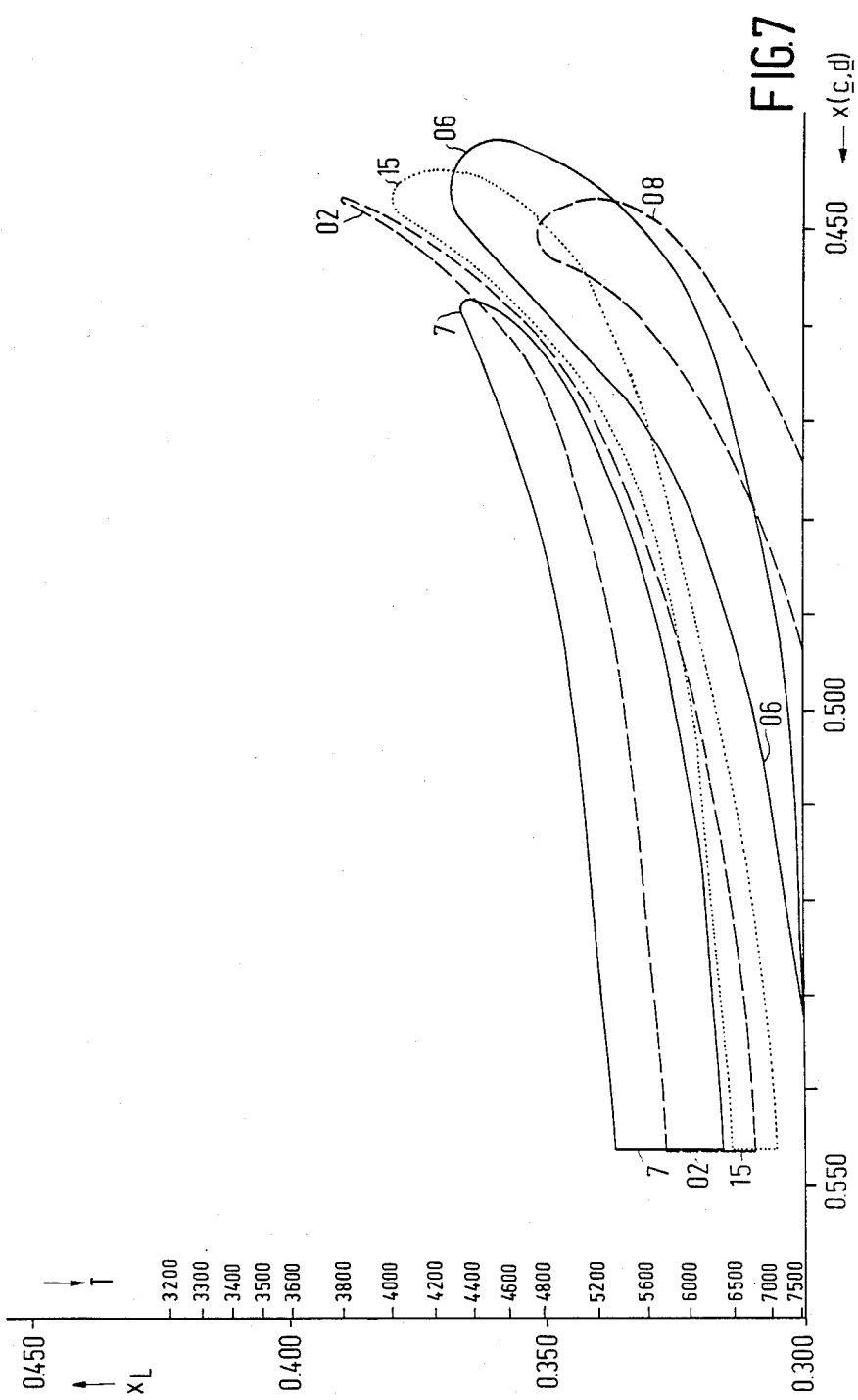

The optimum results are obtained with lamps according to the invention which contain the aforementioned luminescent borate phosphate and have a color temperature of at least 4300 K. and a color point on or substantially on the curve P if the combination $(T, x_H)$ lies in the region between the lines 3 and 4 of the graph of FIG. 6. In this case, lamps can be obtained having R(a,8) and R(a,94) values of at least 90. In FIG. 7 there is indicated in the same manner as in FIG. 3 for a number of practical halophosphates, i.e. the materials 7, 02, 15, 06 and 08 from Table 1, which relative contributions of the materials c and d are possible for lamps containing borate phosphate and having a color point on the curve P.

Embodiments of lamps according to the invention will now be described more fully with reference to FIG. 8, which shows diagrammatically and in cross-section a low-pressure mercury vapor discharge lamp, and with reference to practical compositions of luminescent layers and measurements on lamps provided with these layers.

Figure 8:
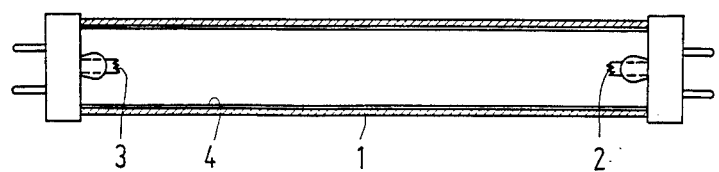
FIG. 8 is a diagrammatical drawing in cross-section of a low-pressure mercury vapor discharge lamp of the invention.

In FIG. 8, reference numeral 1 designates the glass wall of a low-pressure mercury vapour discharge lamp according to the invention. At the ends of the lamp there are provided electrodes 2 and 3 between which the discharge takes place during operation of the lamp. The lamp is provided with rare gas, which serves as ignition gas, and further with a small quantity of mercury. The lamp has a length of 120 cm and an inner diameter of 24 mm and is intended to consume during operation a power of 36 W. The wall 1 is coated on the inner side with a luminescent layer 4 which comprises the luminescent materials a, b, c and, as the case may be, d. The layer 4 may be applied to the wall 1 in a conventional manner, for example, by means of a suspension comprising the luminescent materials.

The following embodiments relate to lamps of the kind described with reference to FIG. 8 (36 W-type). These lamps were provided with a luminescent layer comprising a homogeneous mixture of a blue-luminescing material activated by bivalent europium, a luminescent halophosphate and a luminescent metaborate. All these materials originated from production lots or from larger test lots. For the blue-luminescing material, a choice was made from a strontium aluminate (SAE) of the kind described above and indicated in FIG. 1 by the color point 17, a barium aluminate (BAE) of the kind indicated in FIG. 1 by the color point 20, and a borate phosphate (SBP) comparable with the material indicated in FIG. 1 by the color point 18. As halophosphates three white-luminescing materials were used (halo 8, halo 9 and halo 15), which are analogous to the aforementioned materials having colour points 8, 9 and 15, respectively, in FIG. 1, and a yellow-luminescing halophosphate (halo 10). The luminescent metaborates used (borate 1 to borate 6 inclusive) contain both Mn and Tb so that both the red $Mn^{2+}$ emission and the green $Tb^{3+}$ emission can be supplied by each of these materials. The formulae of the materials used are given in the following Table 2.

TABLE 2

| Phosphor | formula |
|---|---|
| SAE | $Sr_{0.98}Eu_{0.02}Al_{3.5}O_{6.25}$ |
| BAE | $Ba_{0.95}Eu_{0.05}Al_{8.10}O_{13.15}$ |
| SBP | $2(Sr_{0.94}Eu_{0.06}).0.833P_2O_5.0.167B_2O_3$ |
| halo 8 | $Ca_{9.454}Cd_{0.04}(PO_4)_6F_{1.69}Cl_{0.288}:Sb_{0.09}Mn_{0.256}$ |

TABLE 2-continued

| Phosphor | formula |
|---|---|
| halo 9 | $Ca_{9.524}Cd_{0.04}(PO_4)_6F_{1.73}Cl_{0.226}:Sb_{0.09}Mn_{0.186}$ |
| halo 15 | $Ca_{9.641}Cd_{0.025}(PO_4)_6F_{1.584}Cl_{0.36}:Sb_{0.09}Mn_{0.084}$ |
| halo 10 | $Ca_{9.53}(PO_4)_6F_2:Sb_{0.12}Mn_{0.35}$ |
| borate 1 | $Ce_{0.2}Gd_{0.6}Tb_{0.2}Mg_{0.96}Mn_{0.04}B_5O_{10}$ |
| borate 2 | $Ce_{0.2}Gd_{0.6}Tb_{0.2}Mg_{0.9575}Mn_{0.0425}B_5O_{10}$ |
| borate 3 | $Ce_{0.2}Gd_{0.6}Tb_{0.2}Mg_{0.94}Mn_{0.06}B_5O_{10}$ |
| borate 4 | $Ce_{0.2}Gd_{0.6}Tb_{0.2}Mg_{0.93}Mn_{0.07}B_5O_{10}$ |
| borate 5 | $Ce_{0.2}Gd_{0.7}Tb_{0.1}Mg_{0.92}Mn_{0.08}B_5O_{10}$ |
| borate 6 | $Ce_{0.2}Gd_{0.6}Tb_{0.2}Mg_{0.88}Mn_{0.12}B_5O_{10}$ |

In order to determine the properties of these materials, lamps were first manufactured (36 W) which were provided with only the relevant luminescent material. The relative luminous flux $\eta$ (in 1 m/W) and the color point (x,y) were measured. The results are indicated in Table 3.

TABLE 3

| Phosphor | $\eta$ | x | y |
|---|---|---|---|
| SAE | 82 | 0.151 | 0.364 |
| BAE | 66 | 0.161 | 0.238 |
| SBP | 77 | 0.191 | 0.309 |
| halo 8 | 86 | 0.402 | 0.389 |
| halo 9 | 82 | 0.368 | 0.379 |
| halo 15 | 72 | 0.312 | 0.339 |
| halo 10 | 90 | 0.410 | 0.434 |
| borate 1 | 68 | 0.452 | 0.404 |
| borate 2 | 66 | 0.454 | 0.404 |
| borate 3 | 54 | 0.488 | 0.377 |
| borate 4 | 50 | 0.497 | 0.363 |
| borate 5 | 46 | 0.512 | 0.350 |
| borate 6 | 40 | 0.530 | 0.333 |

EXAMPLE 1

A lamp was provided with a luminescent layer consisting of a mixture of
11% by weight of BAE
25% by weight of halo 9
64% by weight of borate 2.
The mass of the luminescent layer in the lamp was 4.05 g. The color temperature T (in K.), the color point (x,y) the deviation of the color point from the curve P ($\Delta P$ in MPCD), the color rendering indices R(a,8) and R(a,94) and the relative luminous flux ($\eta$ in 1 m/W) were measured on the lamp:
T=3790 K., x=0.386, y=0.370 $\Delta P$=−14 MPCD, $\eta$=70 1 m/W, R(a,8)=89 and R(a,94)=87.

EXAMPLE 2

A lamp was provided with a luminescent layer (5.52 g) consisting of a mixture of
7.1% by weight of SBP
28.6% by weight of halo 15,
64.3% by weight of borate 1.
The parameters of this lamp were:
T=4170 K., x=0.373, y=0.371, $\Delta P$=0, $\eta$=70 1 m/W, R(a,8)=90 and R(a,94)=87.
After 100, 1000 and 2000 operating hours, the relative luminous flux was 70, 67 and 65 1 m/W, respectively.

EXAMPLE 3

A lamp was provided with a luminescent layer (4.5 g) consisting of a mixture of
22.2% by weight of SAE
35.8% by weight of halo 8
42% by weight of borate 5.
The parameters of this lamp were:

T=3870 K., x=0.384, y=0.372, ΔP=−9 MPCD, η=64 l m/W, R(a,8)=93 and R(a,94)=90.

EXAMPLE 4

A lamp was provided with a luminescent layer (4.1 g) consisting of a mixture of
17% by weight of SAE
34% by weight of halo 9
49% by weight of borate 4.
The parameters of this lamp were:
T=3640 K., x=0.392, y=0.370, ΔP=−18 MPCD, η=63 l m/W R(a,8)=93 and R(a,94)=90.

EXAMPLE 5

A lamp was provided with a luminescent layer (4.25 g) consisting of a mixture of
26.8% by weight of SAE
30.4% by weight of halo 10
42.8% by weight of borate 6.
The parameters of this lamp were:
T=4100 K., x=0.377, y=0.378, ΔP=+5 MPCD, η=63 l m/W, R(a,8)=94 and R(a,94)=92.

EXAMPLE 6

A lamp was provided with a luminescent layer (42.5 g) consisting of a mixture of
17% by weight of SAE
37% by weight of halo 15
46% by weight of borate 3.
The parameters of this lamp were:
T=4560 K., x=0.359, y=0.365, ΔP=+4 MPCD, η=64 l m/W, R(a,8)=92 and R(a,94)=89.

EXAMPLE 7

A lamp was provided with a luminescent layer (4.75 g) consisting of a mixture of
17.1% by weight of SAE
42.7% by weight of halo 15
40.3% by weight of borate 3.
The parameters of this lamp were:
T=4900 K., x=0.349, y=0.363, ΔP=+12 MPCD, η=66 l m/W, R(a,8)=95 and R(a,94)=94.

Figure 9:
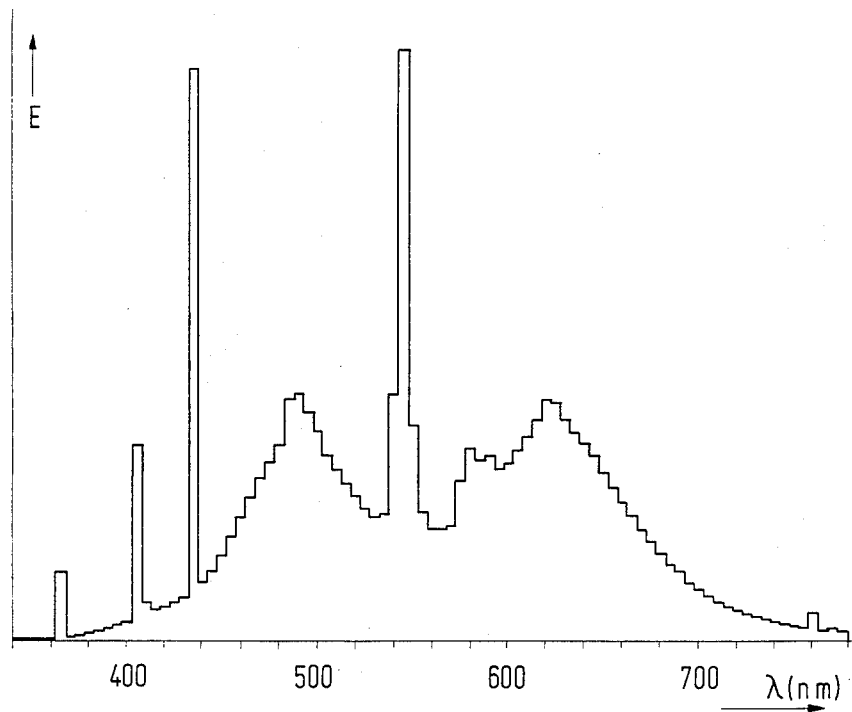
FIG. 9 is a spectral energy distribution of the emitted radiation of a lamp of the invention.

The spectral energy distribution of the emitted radiation of this lamp is shown in FIG. 9. In this Figure, the wave-length λ in nm is plotted on the abscissa; the emitted radiation energy E (in arbitrary units) per wavelength interval of 5 nm is plotted on the ordinate.

What is claimed is:

1. A low pressure mercury vapour discharge lamp having a very satisfactory color rendition with both R(a,8) and R(a,94) being at least 85, having a color temperature of the emitted white light of at least 3200 K. and having a color point $(X_L, Y_L)$ on or near the Planckian locus, which lamp is provided with a gastight radiation-transparent envelope containing mercury and rare gas and with a luminescent layer containing a luminescent halophosphate and a luminescent material activated by bivalent europium, characterized in that the luminescent layer comprises:

a. at least one luminescent alkaline earth metal halophosphate activated by trivalent antimony or by trivalent antimony and by bivalent manganese,
   b. at least one luminescent material activated by bivalent europium and having an emission maximum in the range from 470 to 500 nm and a half-width value of the emission band of at most 90 nm, and
   c. a luminescent rare earth metal metaborate activated by trivalent cerium and by bivalent manganese and having a monoclinic crystal structure and whose fundamental lattice corresponds to the formula $Ln(Mg,Zn,Cd)B_5O_{10}$ in which formula Ln is at least one of the elements yttrium, lanthanum and gadolinium and in which up to 20 mol.% of the B can be replaced by Al and/or Ga and which metaborate exhibits red $Mn^{2+}$ emission.

2. A lamp as claimed in claim 1, characterized in that the luminescent halophosphate a is a calcium halophosphate activated by antimony and manganese and having a color temperature of the emitted radiation of at least 2900 K.

3. A lamp as claimed in claim 1 characterized in that the luminescent layer contains a luminescent material (d) activated by trivalent terbium, which material exhibits green $Tb^{3+}$ emission.

4. A lamp as claimed in claim 3, characterized in that the luminescent metaborate c is further activated by trivalent terbium, the metaborate c being at the same time the material d and satisfying the formula

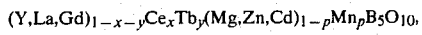
$(Y,La,Gd)_{1-x-y}Ce_xTb_y(Mg,Zn,Cd)_{1-p}Mn_pB_5O_{10}$, in which
$0.01 \leq x \leq 1-y$
$0.01 \leq y \leq 0.75$
$0.01 \leq p \leq 0.30$ and in which up to 20 mol.% of the B can be replaced by Al and/or Ga.

5. A lamp as claimed in claim 1, 2, 3 or 4 characterized in that the material b is a luminescent aluminate activated by bivalent europium and corresponding to the formula $Sr_{1-p}Eu_pAl_qO_{1\frac{1}{2}q+1}$, in which up to 25 mol.% of the strontium can be replaced by calcium and in which $0.001 \leq p \leq 0.10$ and $2 \leq q \leq 5$, which aluminate has its emission maximum at 485–495 nm and has a half-width value of 55–75 nm.

6. A lamp as claimed in claim 5, which has a colour point of the emitted radiation $(x_L, y_L)$ and a color temperature T, T being chosen to lie in the range 3200 K.$\leq T \leq$ 7500 K., characterized in that the halophosphate a is a calcium halophosphate activated by Sb or by Sb and Mn and having a colour point of the emitted radiation $(x_H, y_H)$, $x_H$ lying in the range $0.210 \leq x_H \leq 0.440$ and the combination $(T, x_H)$ lying in the region of the graph of FIG. 2 designated by ABCDEFG.

7. A lamp as claimed in claim 6, having a colour temperature of at least 3700 K. and a color point on or substantially on the Planckian locus, characterized in that the combination $(T, x_H)$ lies in the region between the lines 3 and 4 of the graph of FIG. 2.

8. A lamp as claimed in claim 1, 2, 3, or 4 characterized in that the material b is a luminescent aluminate activated by bivalent europium and corresponding to the formula $Ba_{1-p}Eu_pAl_qO_{1\frac{1}{2}q+1}$, in which the barium can be replaced up to 25 mol.% by strontium and in which $0.005 \leq p \leq 0.25$ and $5 \leq q \leq 10$, which aluminate has its emission maximum at 475–485 nm and has a half-width value of 70–90 nm.

9. A lamp as claimed in claim 8, which has a colour point of the emitted radiation $(x_L, y_L)$ and a color temperature T, T being chosen to lie in the range 3200 K.$\leq T \leq$ 7500 K., characterized in that the halophosphate a is a calcium halophosphate activated by Sb or by Sb and Mn and having a color point of the emitted radiation $(x_H, y_H)$, $x_H$ lying in the range $0.210 \leq x_H \leq 0.440$ and the combination $(T, x_H)$ lying in the region of the graph of FIG. 4 designated by ABC-DEF.

10. A lamp as claimed in claim 9 having a colour temperature of at least 4800 K. and having a colour point on or substantially on the Planckian locus, characterized in that the combination $(T, x_H)$ lies in the region between the lines 2 and 3 of the graph of FIG. 4.

11. A lamp as claimed in claim 1, 2, 3 or 4 characterized in that the material b is a luminescent borate phosphate activated by bivalent europium and corresponding to the formula $$m(Sr_{1-x-y-p}Ba_xCa_yEu_pO).(1-n)P_2O_5.nB_2O_3,$$

in which
$0 \leq x \leq 0.5$
$0 \leq y \leq 0.2$
$0.001 \leq p \leq 0.15$
$1.75 \leq m \leq 2.30$
$0.05 \leq n \leq 0.23$, which borate phosphate has its emission maximum at 470–485 nm and has a half-width value of 80–90 nm.

12. A lamp as claimed in claim 11, which has a color point of the emitted radiation $(x_L, y_L)$ and a colour temperature T, T being chosen to lie in the range 3200 K. $\leq T \leq$ 7500 K., characterized in that the halophosphate a is a calcium halophosphate activated by Sb or by Sb and Mn and having a color point of the emitted radiation $(x_H, y_H)$, $x_H$ lying in the range $0.210 \leq x_H \leq 0.440$ and the combination $(T, x_H)$ lying in the region of the graph of FIG. 6 designated by ABC-DEF.

13. A lamp as claimed in claim 12 having a color temperture of at least 4300 K. and having a color point located on or substantially on the Planckian locus, characterized in that the combination $(T, x_H)$ lies in the region between the lines 3 and 4 of the graph of FIG. 6.

* * * * *